(12) United States Patent
Sim et al.

(10) Patent No.: US 9,398,036 B2
(45) Date of Patent: Jul. 19, 2016

(54) CHUNK-BASED FILE ACQUISITION AND FILE REPUTATION EVALUATION

(71) Applicant: Microsoft Technology Licensing, LLC, Redmond, WA (US)

(72) Inventors: Robert Alexander Sim, Bellevue, WA (US); Christian Seifert, Seattle, WA (US); Anthony Penta, North Bend, WA (US); Elliott Jeb Haber, Fall City, WA (US); Tomasz Kasperkiewicz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/488,719

(22) Filed: Sep. 17, 2014

(65) Prior Publication Data
US 2016/0080400 A1    Mar. 17, 2016

(51) Int. Cl.
*H04L 29/06* (2006.01)
*H04L 29/08* (2006.01)

(52) U.S. Cl.
CPC ............ *H04L 63/1416* (2013.01); *H04L 67/10* (2013.01)

(58) Field of Classification Search
CPC ..... H04L 43/08; H04L 69/40; H04L 63/1416; H04L 63/061; H04L 63/102; H04L 67/10
USPC ..................................................... 726/22–25
See application file for complete search history.

(56) References Cited

U.S. PATENT DOCUMENTS

| 8,214,497 | B2 | 7/2012 | Alperovitch et al. | |
| 8,250,657 | B1 * | 8/2012 | Nachenberg | G06F 21/51 705/50 |
| 8,281,403 | B1 * | 10/2012 | Asheghian | G06F 11/008 705/400 |
| 8,413,235 | B1 * | 4/2013 | Chen | G06F 21/552 713/188 |
| 8,516,592 | B1 * | 8/2013 | Wu | H04L 63/1416 726/12 |

(Continued)

OTHER PUBLICATIONS

"International Search Report & Written Opinion Received for PCT Application No. PCT/US2015/050307", Mailed Date: Nov. 12, 2015, 11 Pages.

*Primary Examiner* — Haresh N Patel
(74) *Attorney, Agent, or Firm* — Bryan Webster; Micky Minhas

(57) ABSTRACT

One or more techniques and/or systems are provided for file acquisition for reputation evaluation. A reputation service may be configured to evaluate files and provide reputations of such files to clients (e.g., an indication as to whether a file is safe or malicious). If the reputation service receives a reputation request for a file that is unknown to the reputation service (e.g., a file not yet fully acquired by the reputation service), then the reputation service may identify a set of chunks into which the file can be partitioned. The reputation service may obtain chunks from various clients, such as a first chunk from a first client and a second chunk from a second client. Such chunks may be evaluated to assign a reputation to the file. In this way, the reputation service may retrieve portions of a file in a distributed manner for reputation evaluation.

20 Claims, 13 Drawing Sheets

(56) References Cited

U.S. PATENT DOCUMENTS

| | | |
|---|---|---|
| 8,572,007 B1 | 10/2013 | Manadhata et al. |
| 8,627,469 B1 * | 1/2014 | Chen .................. G06F 21/00 |
| | | 726/22 |
| 8,635,690 B2 | 1/2014 | Alperovitch et al. |
| 8,671,449 B1 | 3/2014 | Nachenberg |
| 8,769,691 B1 * | 7/2014 | Hsueh ............... H04L 63/1441 |
| | | 726/23 |
| 2002/0046041 A1 | 4/2002 | Lang |
| 2009/0282476 A1 * | 11/2009 | Nachenberg ............ G06F 21/50 |
| | | 726/22 |
| 2009/0328209 A1 * | 12/2009 | Nachenberg ............ G06F 21/62 |
| | | 726/22 |
| 2010/0005291 A1 | 1/2010 | Hulten et al. |
| 2010/0058468 A1 | 3/2010 | Green et al. |
| 2010/0318759 A1 * | 12/2010 | Hamilton ............ G06F 11/1451 |
| | | 711/171 |
| 2011/0162070 A1 | 6/2011 | Krasser et al. |
| 2012/0246598 A1 | 9/2012 | Narayanan |
| 2013/0042294 A1 | 2/2013 | Colvin et al. |
| 2013/0097661 A1 * | 4/2013 | Ma ........................ H04L 63/145 |
| | | 726/1 |
| 2013/0254880 A1 | 9/2013 | Alperovitch et al. |
| 2013/0305039 A1 * | 11/2013 | Gauda ................. G06F 21/6218 |
| | | 713/153 |
| 2014/0161006 A1 * | 6/2014 | Hall .................... H04L 12/1845 |
| | | 370/310 |
| 2014/0283066 A1 * | 9/2014 | Teddy ..................... G06F 21/51 |
| | | 726/23 |
| 2014/0289853 A1 * | 9/2014 | Teddy ................. H04L 63/1416 |
| | | 726/23 |

\* cited by examiner ure to embody one or more of the provisions set forth herein
CHUNK-BASED FILE ACQUISITION AND FILE REPUTATION EVALUATION

BACKGROUND

Many applications and services provide security for computing devices. In an example, a security service, such as an antivirus service, may scan a computer to identify 'infected' files that have viruses, malware, malicious code, etc. The security service may identify, isolate, and/or remove such files. The security service may also disseminate information regarding such files in an effort to protect other computing devices from such files.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for file acquisition for reputation evaluation are provided herein. A reputation service may be configured to receive reputation requests from clients, and may return reputations of known files to such clients. If a client requests a reputation for a file that is unknown to the reputation service, then the reputation service will be unable to return a reputation until the file is acquired and evaluated by the reputation service. Because the file may be relatively large, obtaining the entire file from a single client may tax resources (e.g., bandwidth) and/or otherwise incur inefficiencies. Accordingly, as provided herein, the reputation service may obtain portions of the file from a plurality of clients (e.g., given user consent) in a distributed manner. In an example, a user may take affirmative action to provide opt-in consent to allow the acquisition of files and/or chunks of files associated with a client, such as for the purpose of reputation evaluation of such files (e.g., where the user responds to a prompt regarding the collection and/or use of such file related data).

In an example, a reputation request may be received from a first client. The reputation request may comprise a file identifier of a file (e.g., a hash of a videogame file associated with a videogame application downloaded by the first client such as a tablet device client). Responsive to the file identifier corresponding to a reputation of the file, the reputation may be provided to the first client. Responsive to determining that the file is unknown (e.g., the file identifier does not match a reputation within a file reputation data structure), a set of chunks into which the file can be partitioned may be identified (e.g., the set of chunks may initially comprise placeholders, such as chunk identifiers, for chunks because the reputation service may not yet have obtained such chunks from clients). A first chunk of the file may be retrieved from the first client. One or more additional chunks of the file may be retrieved from other clients, such as a second chunk retrieved from a second client (e.g., responsive to the second client requesting a reputation of the file). The first chunk, the second chunk, and/or other chunks may be evaluated to assign a reputation to the file (e.g., a degree of maliciousness or non-maliciousness of the file). The reputation service may provide the reputation to the first client and/or other clients. In this way, the reputation service may acquire chunks of files in a distributed manner from a plurality of clients, and may reconstruct such files from the chunks in order to evaluate and assign reputations to the files.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
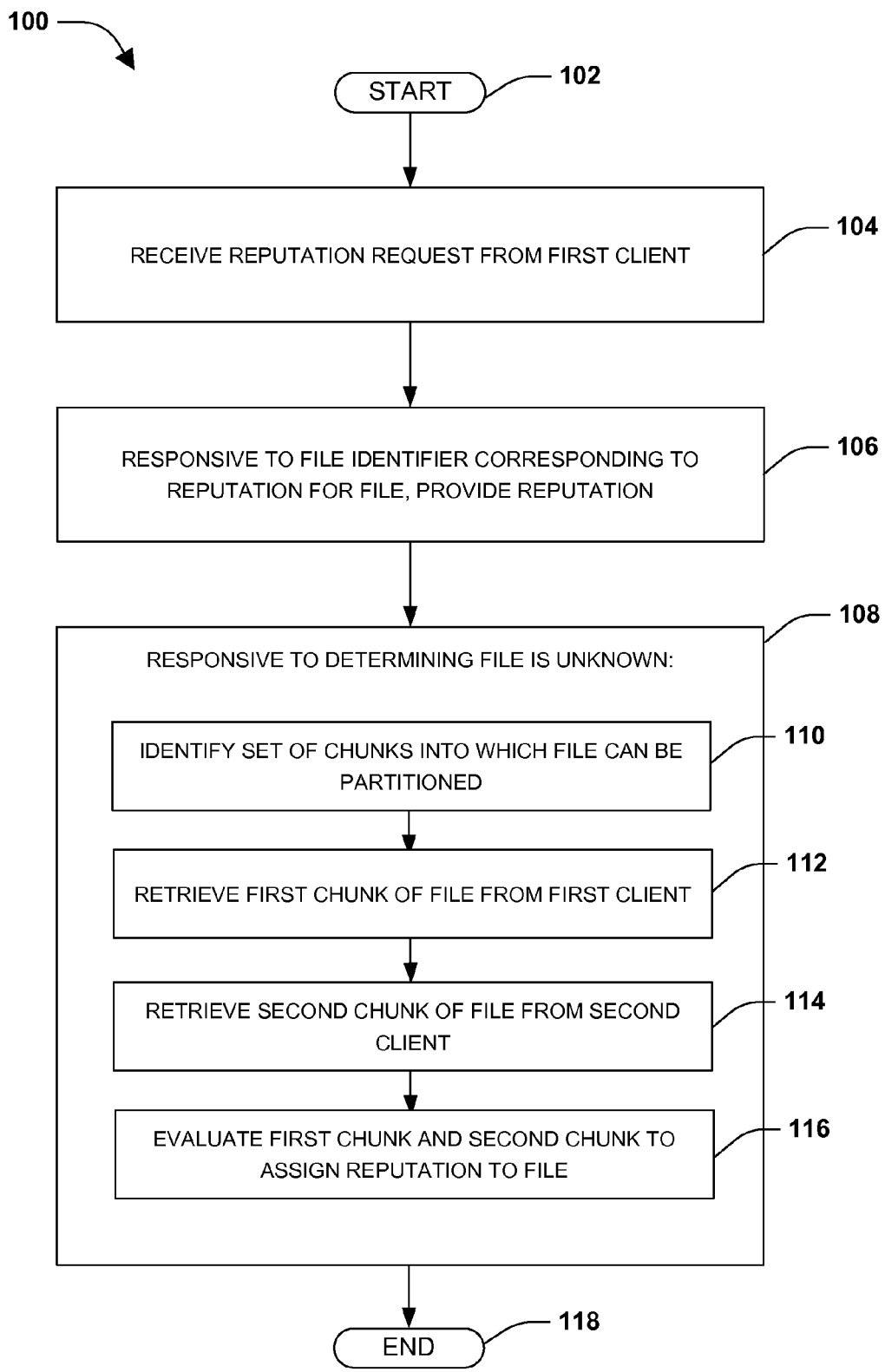
FIG. 1 is a flow diagram illustrating an exemplary method of file acquisition for reputation evaluation.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more techniques and/or systems for file acquisition for reputation evaluation are provided herein. A reputation service may be configured to provide clients with reputations of files (e.g., reputations for applications, documents, videogames, videos, photos, etc.), such as a degree of maliciousness or non-maliciousness. The reputation service may discover new files for reputation evaluation by discovering and obtaining files from internet sources. However, some files may be unavailable due to being stored behind authentication credentials unknown to the reputation service and/or being hosted by a source having a URL unknown to the reputation service (e.g., a file on personal laptop). Accordingly, the reputation service may identify a new file that is unknown to the reputation service based upon receiving a reputation request for the new file (e.g., based upon receiving a file reputation request comprising a file identifier for a file, such as an SHA256 hash of the file, that the reputation server has not previously encountered). The reputation service may identify a set of chunks into which the new file can be partitioned (e.g., the new file may be relatively large, and thus impractical to obtain from a single client). The reputation service may obtain chunks of the new file from a plurality of clients (e.g., given user consent) in a distributed manner (e.g., according to a distributed upload configuration where multiple clients provide portions of a file to a single source such as the reputation service). In an example, a user may take affirmative action to provide opt-in consent to allow acquisition of files and/or chunks of files associated with a client device, such as for the purpose of reputation evaluation of such files (e.g., where the user responds to a prompt regarding the collection and/or use of such file related data). The reputation service may reconstruct the new file from the chunks, and may assign a reputation to the new file (e.g., after verifying the identity of the new file (e.g., verifying an SHA256 hash of the new file)). In this way, the reputation service may obtain files in a distributed manner from a plurality of clients.

An embodiment of file acquisition for reputation evaluation is illustrated by an exemplary method 100 of FIG. 1. At 102, the method starts. At 104, a reputation request may be received from a first client. The reputation request may comprise a file identifier of a file. For example, a videogame console client, associated with a user Dave, may download a racing videogame from an internet source. A hash of a racing videogame file associated with the racing videogame may be generated as the file identifier. In an attempt to determine whether the racing videogame file is safe or malicious, the reputation request may be sent from the videogame console client to a reputation service.

The reputation service may query a file reputation data structure using the file identifier to determine whether a reputation for the file exists. It is to be appreciated that any file may generally be identified by a unique identifier, such as a compact identifier that is universally computable on any computing device (e.g., SHA256 hash). At 106, responsive to the file identifier corresponding to the reputation for the file, the reputation may be provided to the first client (e.g., there is an entry in the file reputation data structure corresponding to the file identifier). At 108, responsive to determining that the file is unknown, a set of chunks into which the file can be partitioned may be identified (e.g., the set of chunks may initially comprise placeholders, such as chunk identifiers, for chunks because the reputation service may not yet have obtained such chunks from clients), at 110. In an example, the racing videogame file may comprise 4 GB of data, and thus one hundred 4 MB chunks may be identified as the set of chunks into which the racing videogame file may partitioned (e.g., the chunk size may be set based upon various criteria such as a potential number of clients that may comprise the file, bandwidth of such clients, a data plan type of a client, whether a client is connected to wifi, and/or a variety of other considerations). In another example, the set of chunks may specify one or more overlapping chunks (e.g., a first chunk may comprise overlapping file data with respect to a second chunk). In an example of identifying the set of chunks, a distribution curve may be generated based upon the set of chunks. The distribution curve may specify a distribution of chunks that are to be retrieved from clients. For example, the distribution may comprise a random distribution, a sequential distribution, an ordered distribution, an overlapping distribution, an ordered overlapping distribution, a prioritization distribution (e.g., a prioritization of which chunks, such as code segments, to obtain and/or in what order to obtain such chunks), or any other type of distribution.

In an example, retrieval priorities may be assigned to respective chunks within the set of chunks. For example, a first retrieval priority may be assigned to the first chunk and a second retrieval priority may be assigned to the second chunk. The first retrieval priority may be higher than the second retrieval priority based upon a determination that the first chunk has a reputation evaluation relevancy that is greater than the second chunk (e.g., the first chunk may correspond to data or code segments of an executable file that are indicative of maliciousness whereas the second chunk may comprise data or code segments which are common across both malicious and benign files). In an example, indicators may be assigned to respective chunks within the set of chunks. When a chunk has been received by the reputation service from a client, then an indicator for the received chunk may be set to an acquired state. If multiple copies of the chunk are to be retrieved from different clients, then the indicator may be increased, decremented, or modified to indicate that a copy of the chunk has been received. In an example, chunk identifiers (e.g., hashes) may be generated for respective chunks within the set of chunks. In an example, multiple files may be associated with a single chunk (e.g., a built-in library, such as an I/O library, may be shared across multiple files), and thus a chunk identifier may be used to track the chunk across such files (e.g., so that the chunk may efficiently be identified and/or obtained from a location of a file known to share the chunk).

At 112, the first chunk of the file may be retrieved from the first client. In an example, an operating context of the first client may be identified (e.g., the mobile device client may be connected to a wifi network, charging, in an idle state, etc.). Acquisition of the first chunk from the first client may be scheduled (e.g., triggered) based upon the operating context corresponding to an upload policy (e.g., the first chunk may be acquired from the first client when the first client connects to a wifi network, but is executing little to no operational activity, such as based upon a wifi network connection upload policy). In an example, the first chunk may be retrieved from one or more additional clients based upon an overlapping distribution specifying redundant retrieval for the first chunk. In an example, the first chunk, from the first client, may be compared with a second instance of the first chunk, from a different client, to verify that the first chunk, from the first client, is received in a non-tampered state. At 114, the second chunk of the file may be retrieved from a second client (e.g., a laptop device, associated with a user Mary, may send a reputation request comprising a file identifier for the racing videogame file or any other file that may be associated with a chunk identifier for the second chunk and the reputation request may result in a request for the second chunk from the laptop device).

In an example, one or more additional chunks within the set of chunks may be acquired from various clients. In an example, a file layout of the file may be determined. A distribution and prioritization algorithm may be used to prioritize chunks, such as code segments, to obtain from clients (e.g., based upon urgency, a number of comparators, a "best effort" for completeness, a number of clients to fetch from, etc.). In an example, a future acquisition of a third chunk of the file may be scheduled from the first client, the second client, and/or another client (e.g., a client having a probability of owning the third chunk above an acquisition threshold). In an example, a transmission initiation of a chunk of the file may be received from a client (e.g., the client may randomly send the transmission initiation). Responsive to the chunk having been previously retrieved by the reputation service (e.g., a threshold number of copies of the chunk may have been acquired by the reputation service), transmission of the chunk may be cancelled, which may mitigate unnecessary bandwidth utilization. Responsive to determining that the chunk or a threshold number of copies of the chunk have not yet been retrieved, the transmission of the chunk may be accepted. In an example, the chunk may be evaluated to determine and/or update a reputation of the file.

In an example of processing the reputation request from the first client, the file may be determined as being known but that less than all chunks of the file are available to the reputation service. A chunk, unavailable to the reputation service, may be retrieved from the first client. In this way, one or more chunks of the file may be retrieved from various clients according to a distributed manner. At 116, the first chunk, the second chunk, and/or other chunks may be evaluated to assign a reputation to the file. The reputation may be provided to the first client and/or other clients, such as a subsequent client accessing the reputation service after the reputation becomes determinable (e.g., when a threshold number of chunks are available for evaluation). In an example, the reputation may be a pre-calculated value or may be dynamically created on-the-fly based upon various reputational information about the file. At 118, the method ends.

Figure 2A:
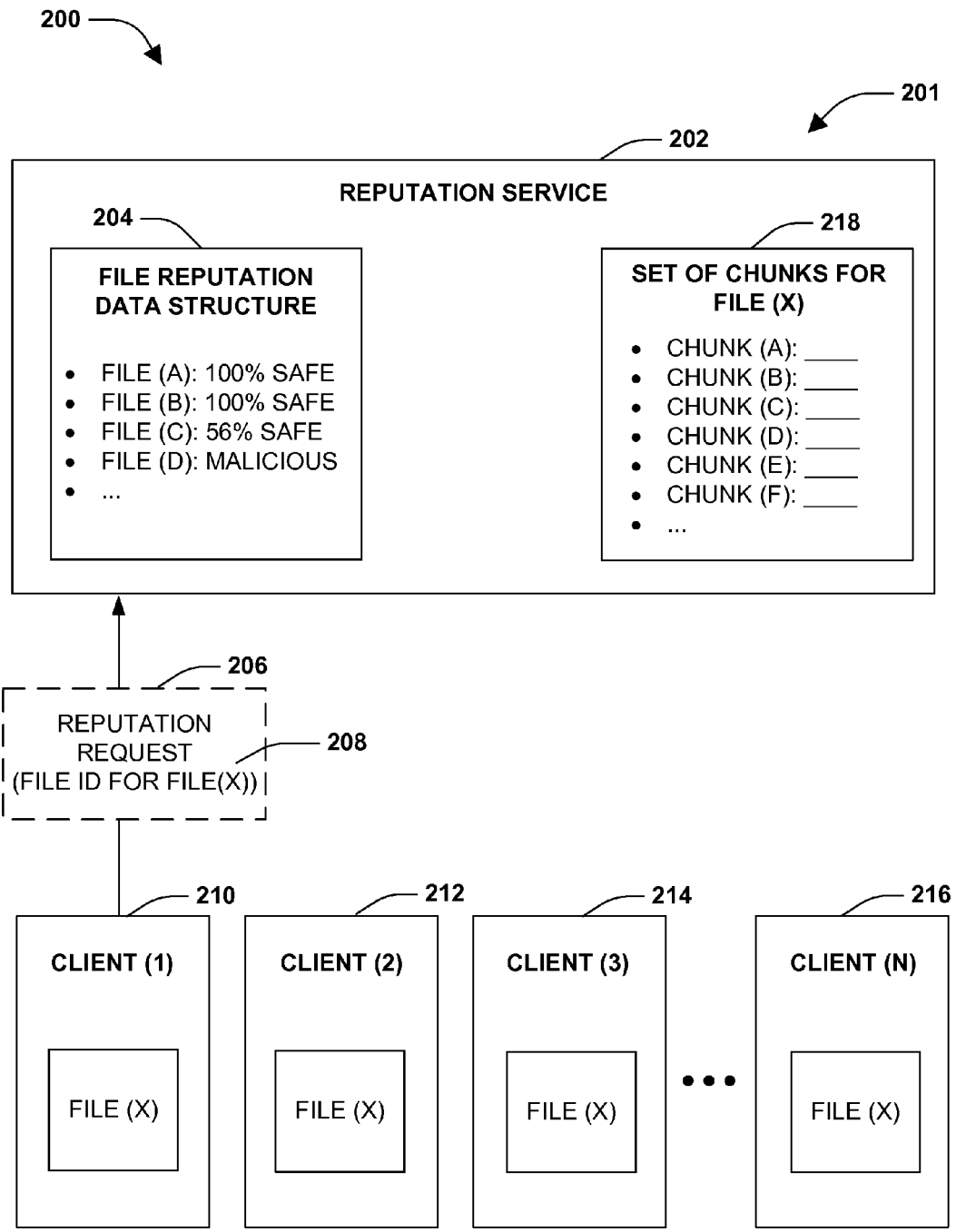
FIG. 2A is a component block diagram illustrating an exemplary system for file acquisition for reputation evaluation, where a reputation request is received.

FIGS. 2A-2H illustrate examples of a system 201 for file acquisition for reputation evaluation. FIG. 2A illustrates an example 200 of the system 201 comprising a reputation service 202. The reputation service 202 may be configured to provide clients, such as a first client 210, a second client 212, a third client 214, and/or other clients such as client 216, with reputations for files. A reputation may, for example, indicate a degree of maliciousness or non-maliciousness of a file. In an example, a reputation request 206 may be received from the first client 210 (e.g., the first client 210, such as a smart phone owned by user Dave, may comprise a file (X) corresponding to a restaurant app downloaded from an app download source). The reputation request 206 may comprise a file identifier 208 for the file (X). The reputation service 202 may be configured to query a file reputation data structure 204 using the file identifier 208 to determine whether a reputation for the file (X) is known. Because the file (X) may be unknown to the reputation service 202 and does not have a reputation, a set of chunks 218 into which the file (X) can be partitioned may be identified (e.g., the set of chunks 218 may initially comprise placeholders, such as chunk identifiers, for chunks because the reputation service 202 may not yet have obtained such chunks from clients). For example, the set of chunks 218 may comprise a chunk (A) identifier for a chunk (A), a chunk (B) identifier for a chunk (B), a chunk (C) identifier for a chunk (C), a chunk (D) identifier for a chunk (D), a chunk (E) identifier for a chunk (E), a chunk (F) identifier for a chunk (F), and/or other chunk identifiers (e.g., hashes) of chunks.

Figure 2B:
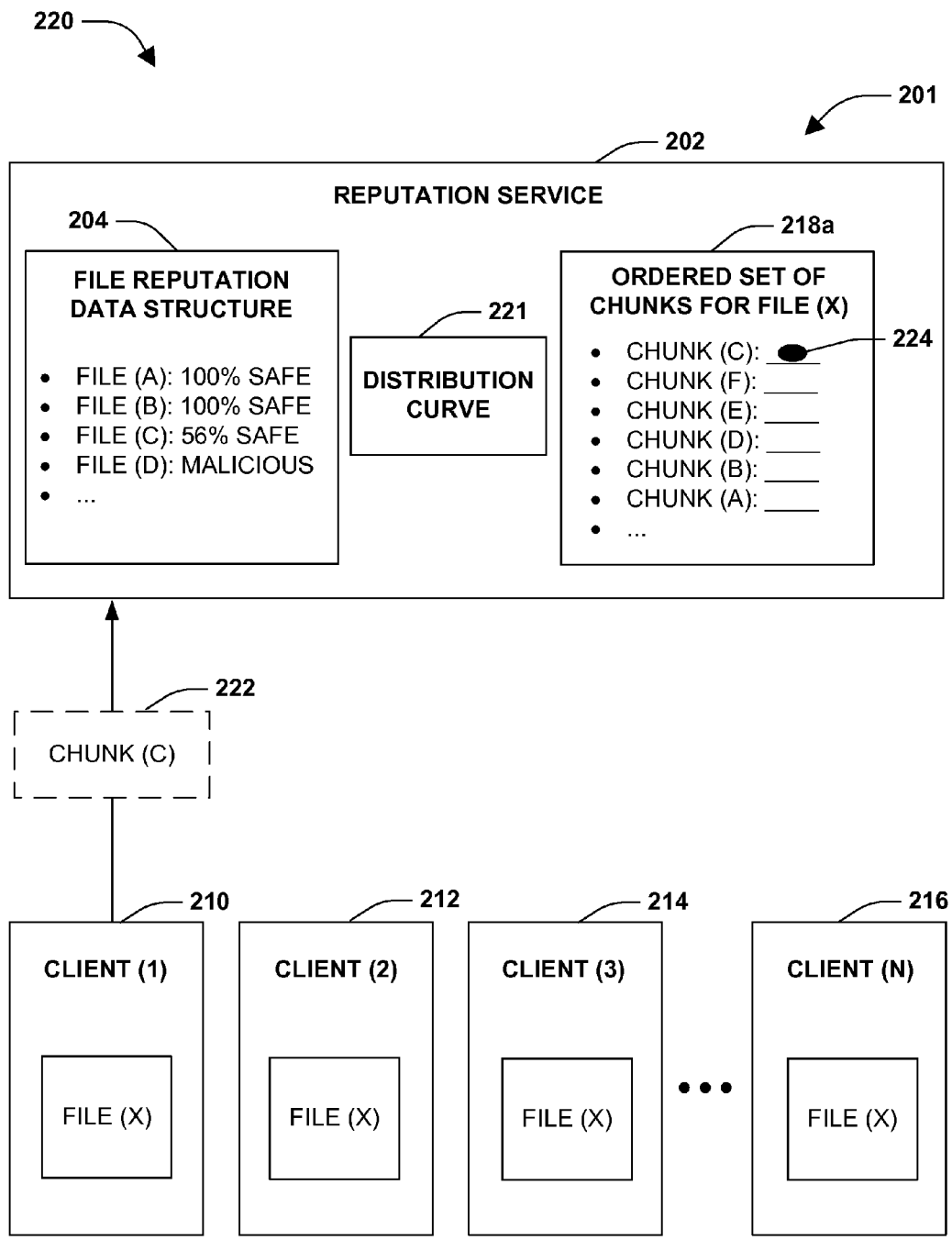
FIG. 2B is a component block diagram illustrating an exemplary system for file acquisition for reputation evaluation, where a chunk of a file is received.

FIG. 2B illustrates an example 220 of generating a distribution curve 221 and/or ordering the set of chunks 218 to create an ordered set of chunks 218a. In an example, the reputation service 202 may generate the distribution curve 221 (e.g., a scheme for obtaining chunks from various clients) based upon the set of chunks 218. The distribution curve 221 may specify a distribution of chunks that are to be retrieved from clients. In an example, the distribution curve 221 may be indicative of an order with which to obtain chunks (e.g., chunks having relatively higher reputation evaluation relevancies may be ordered/ranked higher than other chunks). For example, chunk (C) may be ordered first for retrieval, chunk (F) may be ordered second for retrieval, chunk (E) may be ordered third for retrieval, etc. In an example, chunk (C) 222 may be retrieved from the first client 210. A chunk (C) indicator 224 may be set to an acquired state based upon the reputation service 202 acquiring the chunk (C) 222.

Figure 2C:
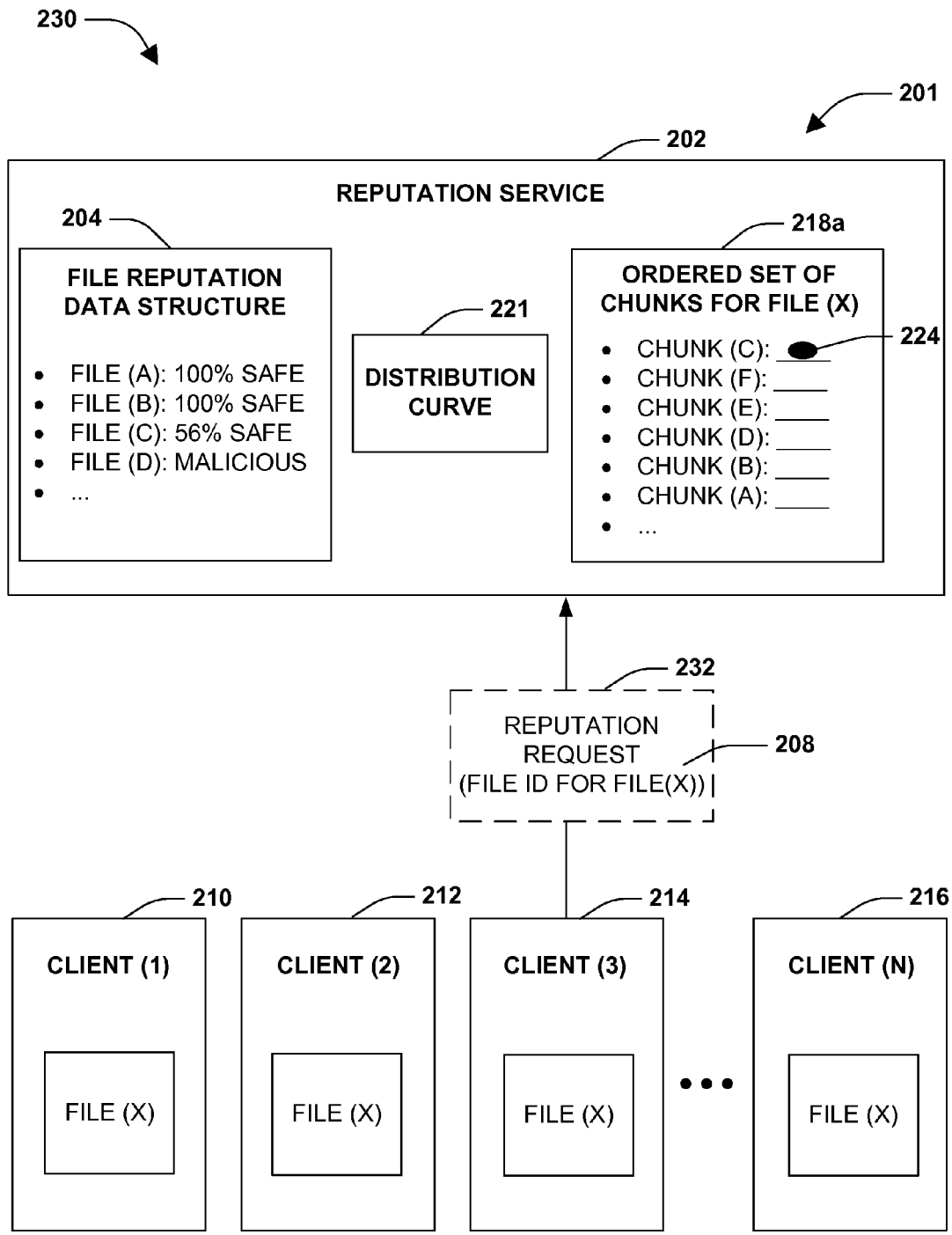
FIG. 2C is a component block diagram illustrating an exemplary system for file acquisition for reputation evaluation, where a reputation request is received.
Figure 2D:
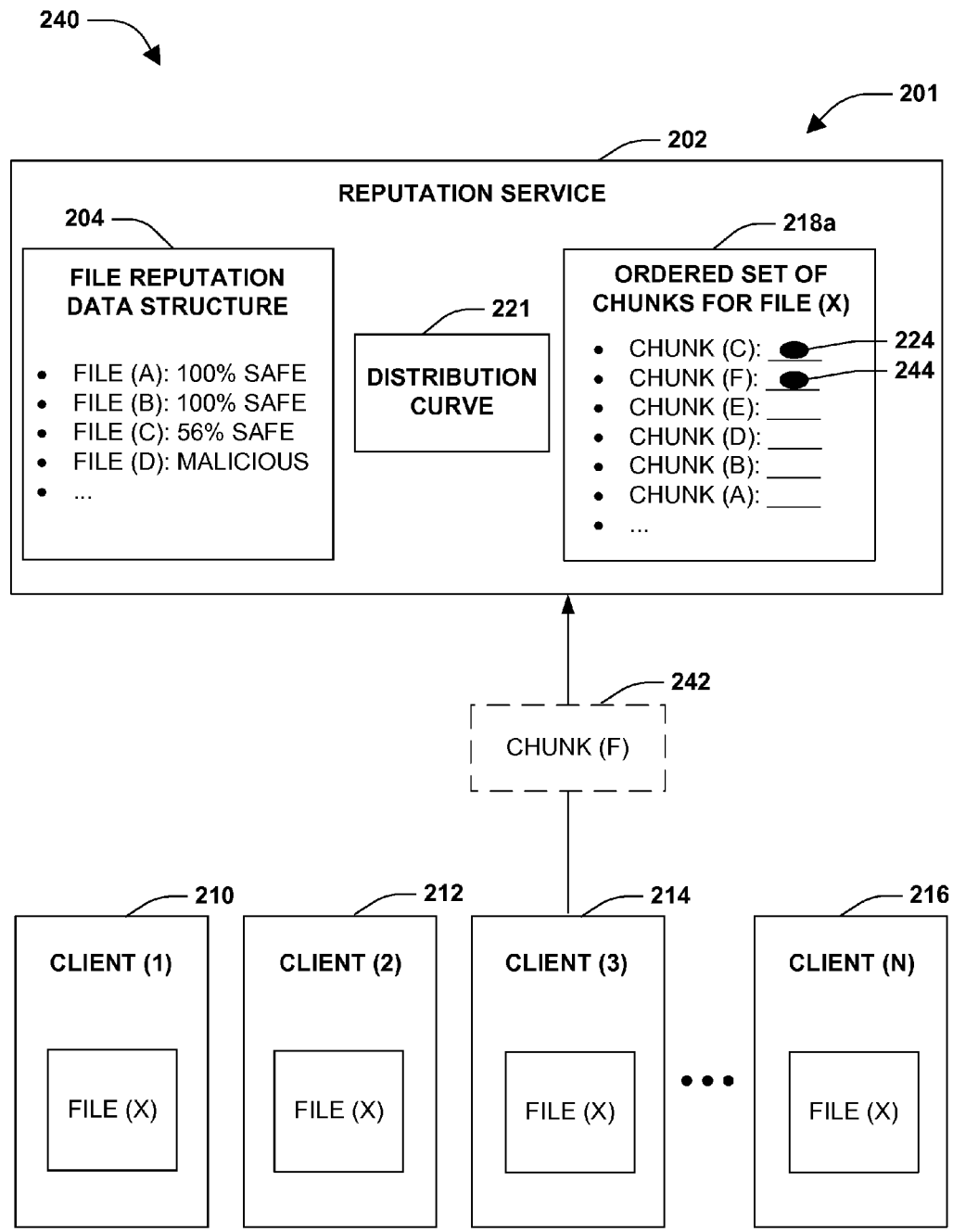
FIG. 2D is a component block diagram illustrating an exemplary system for file acquisition for reputation evaluation, where a chunk of a file is received.

FIG. 2C illustrates an example 230 of the reputation service 202 receiving a reputation request 232 from the third client 214. The reputation request 232 may comprise the file identifier 208 for the file (X) (e.g., the third client 214, such as a tablet device owned by Jill, may comprising the file (X) corresponding to the restaurant app downloaded from an app download source). The reputation service 202 may be configured to query the file reputation data structure 204 using the file identifier 208 to determine whether a reputation for the file (X) is known. The reputation service 202 may determine that file (X) is known, does not yet have a reputation, and that less than all chunks for file (X) are available. Accordingly, the reputation service 202 may obtain the chunk (F) 242 from the third client 214, as illustrated in example 240 of FIG. 2D. In an example, the third client 214 may send the chunk (F) 242 during a low activity state (e.g., while the tablet device is connected to wifi, is charging, and/or has available computing resources to transmit the chunk (F) 242 to the reputation service 202). A chunk (F) indicator 244 may be set to an acquired state based upon the reputation service 202 acquiring the chunk (F) 242.

Figure 2E:
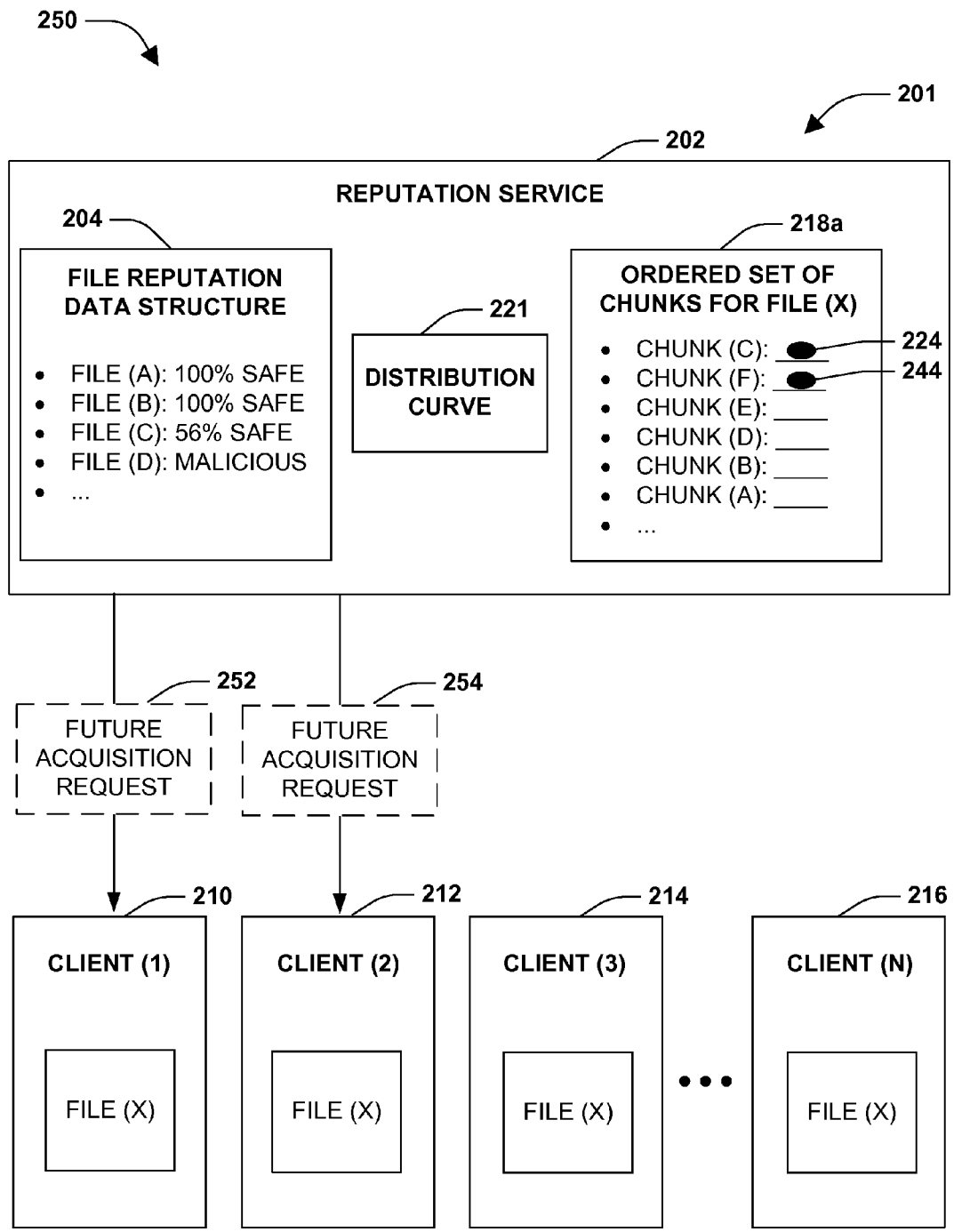
FIG. 2E is a component block diagram illustrating an exemplary system for file acquisition for reputation evaluation, where one or more future acquisition requests are sent to one or more clients.

FIG. 2E illustrates an example 250 of scheduling future acquisitions of chunks of the file (X). The reputation service 202 may evaluate the ordered set of chunks 218a to identify one or more unavailable chunks of file (X), such as chunk (E), chunk (D), chunk (B), chunk (A), etc. (e.g., chunks not yet acquired by the reputation service 202). The reputation service 202 may schedule a future acquisition 252 with the first client 210 and a future acquisition 254 with the second client 212 for one or more unavailable chunks.

Figure 2F:
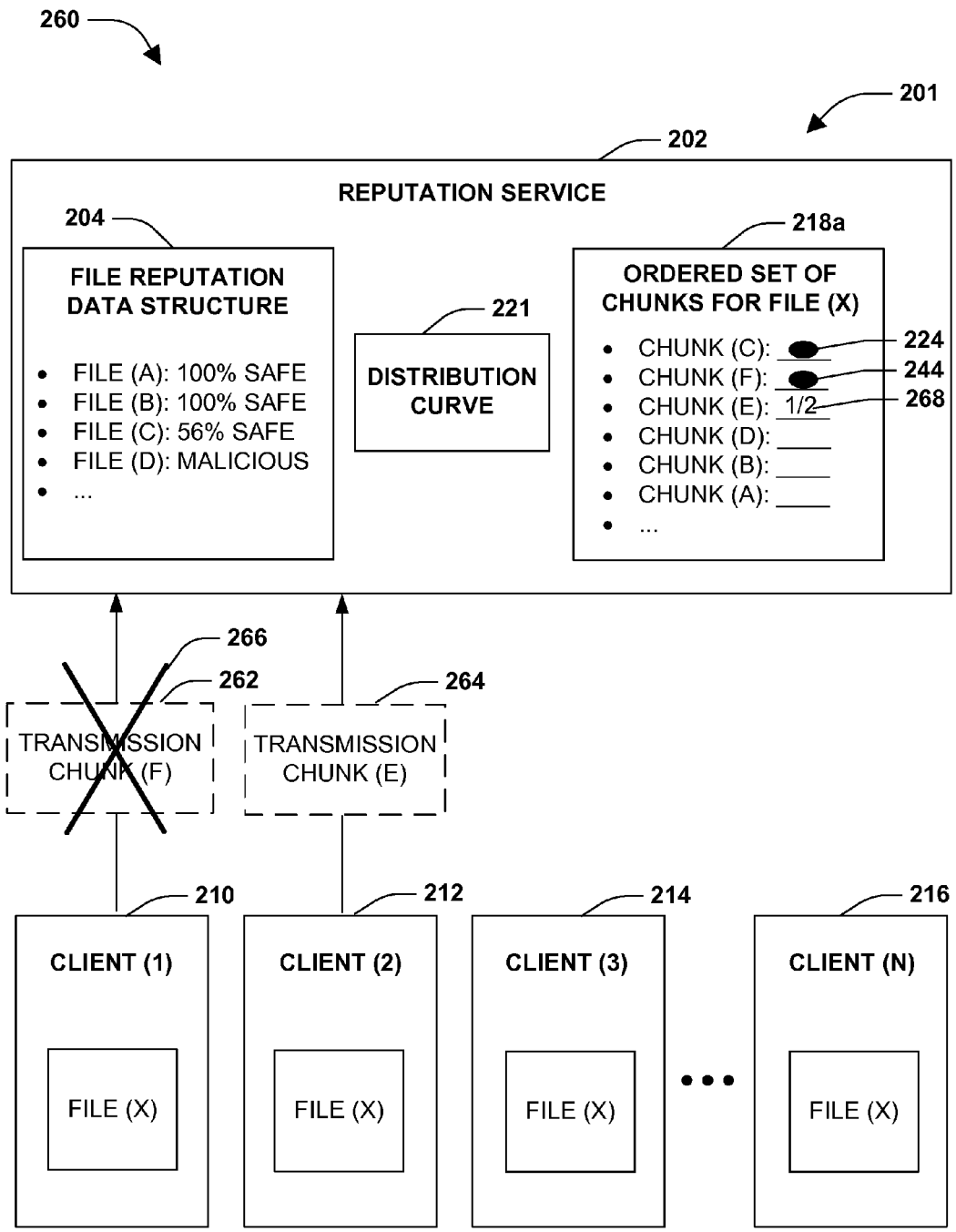
FIG. 2F is a component block diagram illustrating an exemplary system for file acquisition for reputation evaluation, where one or more transmission initiations are received.

FIG. 2F illustrates an example 260 of the reputation service 202 receiving one or more transmission initiations from clients. The first client 210 may send a first transmission initiation 262 of chunk (F) to the reputation service 202. Responsive to the reputation service 202 determining that the chunk (F) has been previously retrieved (e.g., the reputation service 202 may determine that the chunk (F) indicator 244 is set to the acquired state), the reputation service 202 may cancel 266 the transmission of the chunk (F). The second client 212 may send a second transmission initiation 264 of chunk (E) to the reputation service 202. Responsive to the reputation service 202 determining that chunk (E) has not yet been retrieved, the reputation service 202 may accept the transmission of the chunk (E). A chunk (E) indicator 268 may be set to an acquired state based upon the reputation service 202 acquiring the chunk (E). For example, the acquired state may indicate that 1 out of 2 instances of chunk (E) have been obtained (e.g., the distribution curve 221 may specify that 2 instances of chunk (E) are to be obtained from 2 different clients).

Figure 2G:
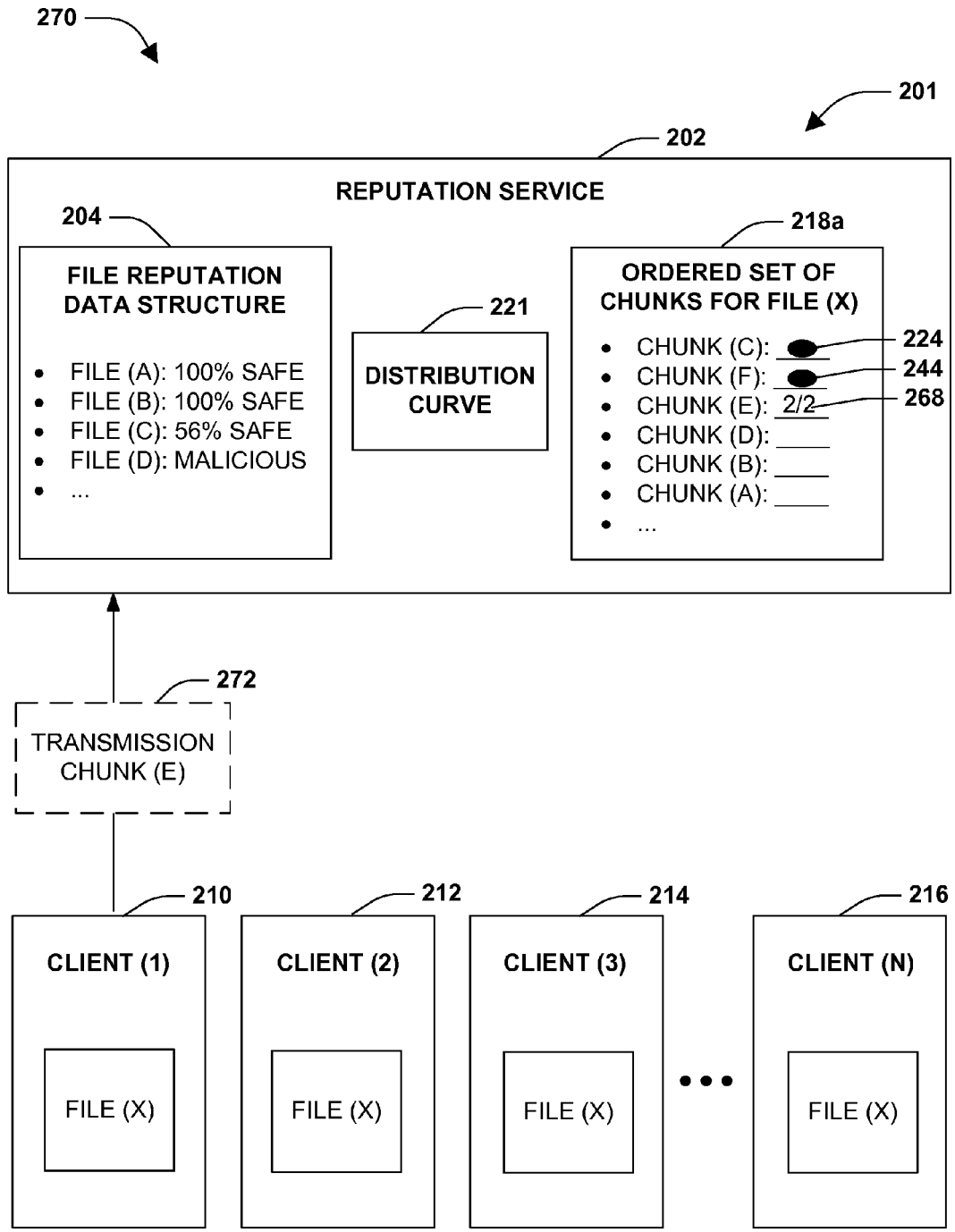
FIG. 2G is a component block diagram illustrating an exemplary system for file acquisition for reputation evaluation, where a transmission initiation is received.

FIG. 2G illustrates an example 270 of the reputation service 202 accepting transmission 272 of a second instance of chunk (E). For example, the distribution curve 221 may comprise an overlapping distribution specifying redundant retrieval for chunk (E), such as for verification purposes.

Accordingly, the reputation service 202 may evaluate the ordered set of chunks 218a to determine that 1 out of 2 instances of chunk (E) have been retrieved (e.g., example 260 of FIG. 2F). In this way, the reputation service 202 may accept transmission 272 of the second instance of chunk (E). The chunk (E) indicator 268 may be updated so that the acquired state indicates that 2 out of 2 instances of chunk (E) have been obtained.

Figure 2H:
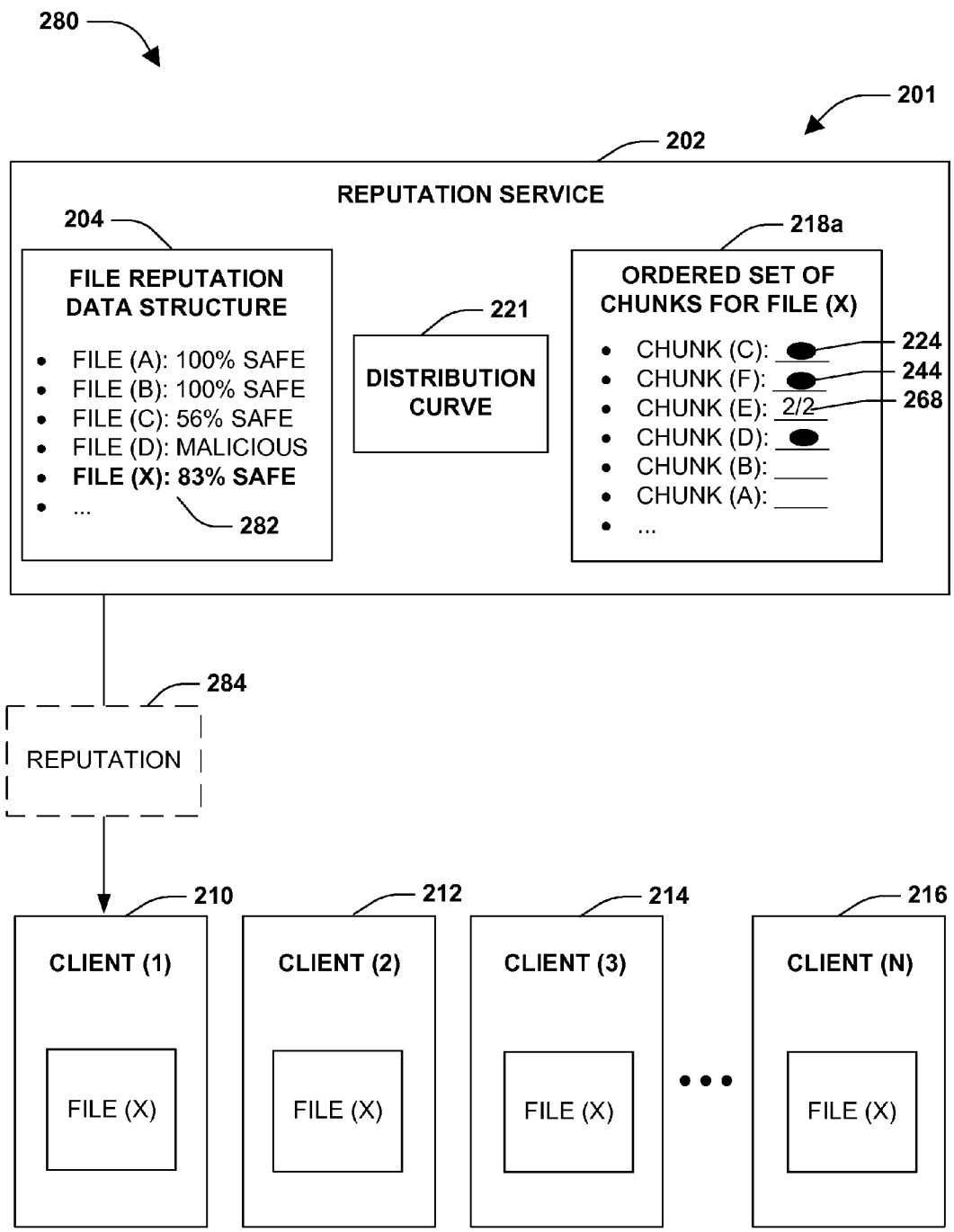
FIG. 2H is a component block diagram illustrating an exemplary system for file acquisition for reputation evaluation, where a reputation of a file is provided to one or more clients.

FIG. 2H illustrates an example 280 of the reputation service 202 acquiring a threshold number of reputation indicative chunks of file (X). For example, chunk (C), chunk (F), two instances of chunk (E), and chunk (D) may have been obtained from various clients. The reputation service 202 may not yet have retrieved chunk (B) and chunk (A). However, chunk (B) and chunk (A) may provide relatively low indication of reputation for file (X). Accordingly, the reputation service 202 may determine that a threshold number of reputation indicative chunks of file (X) have been acquired (e.g., chunk (C), chunk (F), two instances of chunk (E), and chunk (D), and thus may evaluate such chunks to assign a reputation 282 of 83% safe to the file (X). The reputation 282 may be provided 284 to the first client 210 and/or other clients.

Figure 3:
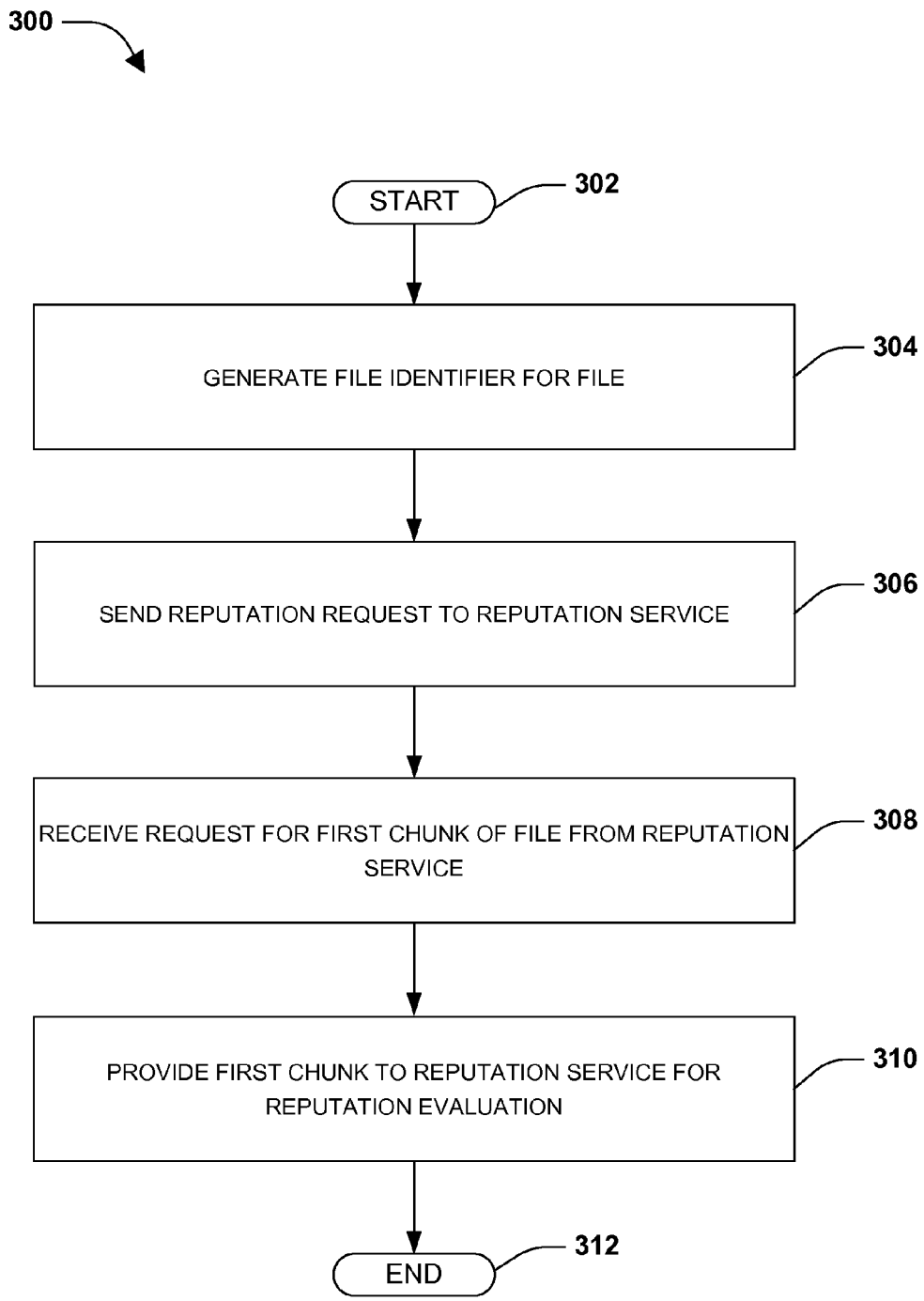
FIG. 3 is a flow diagram illustrating an exemplary method of facilitating reputation evaluation.

An embodiment of facilitating reputation evaluation is illustrated by an exemplary method 300 of FIG. 3. At 302, the method starts. At 304, a file identifier may be generated for a file associated with a client. For example, a client device may obtain a social network file associated with a social network application. The client device may generate a social network file identifier, such as a hash, for the social network file. At 306, a reputation request may be sent (e.g., from the client device) to a reputation service. The reputation request may comprise the file identifier. An indication that a reputation for the file is unknown may be received from the reputation service. At 308, a request for a first chunk of the file may be received from the reputation service (e.g., a 4 mb chunk of the social network file). At 310, the first chunk may be provided to the reputation service for reputation evaluation.

In an example, a second chunk may be provided to the reputation service for reputation evaluation based upon a low activity period of the client (e.g., the client device may be connected to a wifi network and may have available bandwidth for sending a second 4 mb chunk of the social network file). In another example, a future acquisition request may be received from the reputation service. The future acquisition request may request a third chunk of the file from the client within an acquisition time span (e.g., the future acquisition request may expire within 5 days). The third chunk may be provided to the reputation service within the acquisition time span.

A reputation for the file may be received from the reputation service. The reputation may be based upon an evaluation of the first chunk from the client and one or more chunks obtained by the reputation service from other clients. At 312, the method ends.

Figure 4:
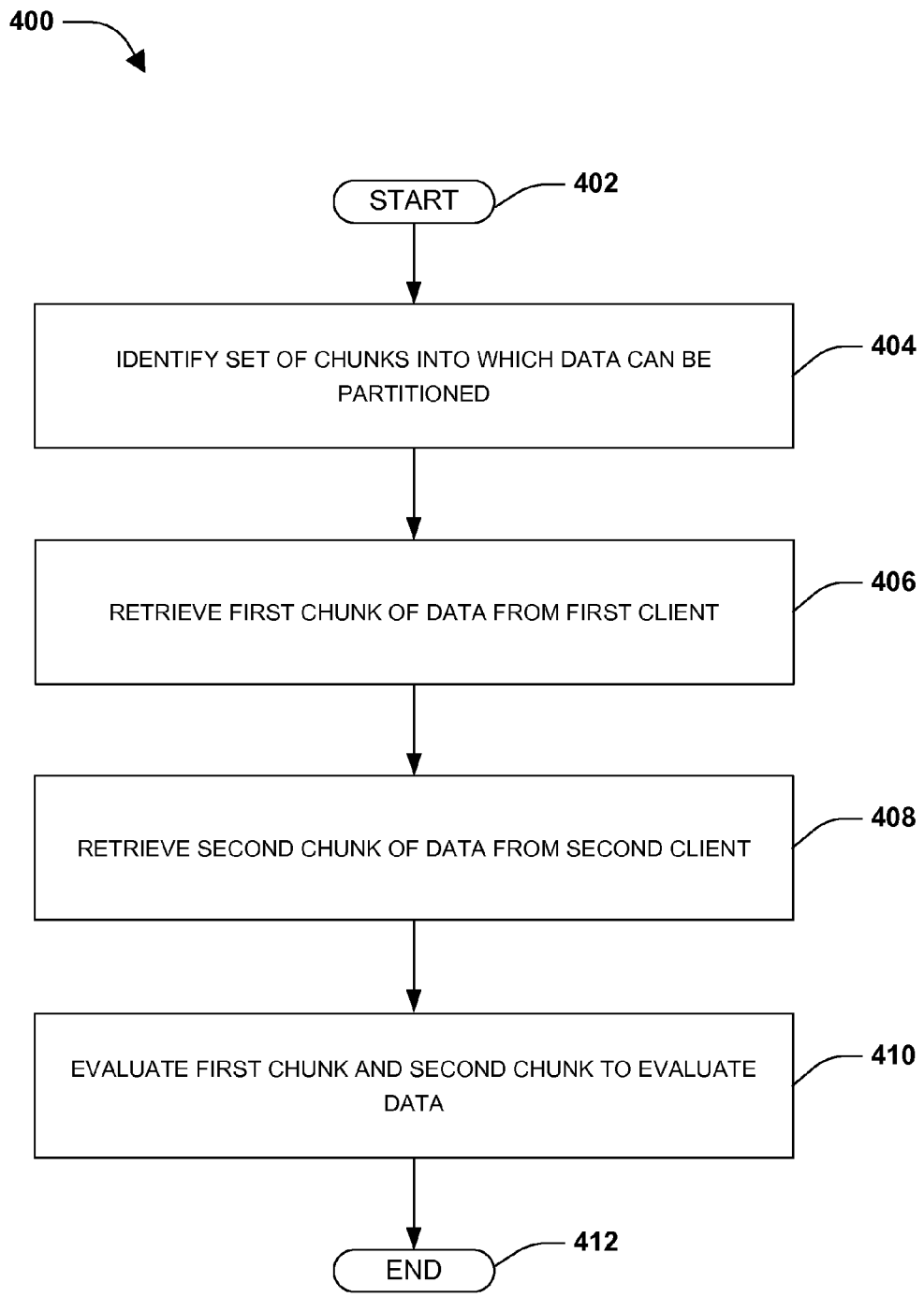
FIG. 4 is a flow diagram illustrating an exemplary method of data acquisition.

An embodiment of data acquisition is illustrated by an exemplary method 400 of FIG. 4. At 402, the method starts. Data may be acquired in a distributed manner from multiple clients, such as according to a distributed upload process. At 404, a set of chunks into which data (e.g., an event log collection used for diagnostic purposes, crash dump data used to evaluate crash information that may be common amongst multiple clients, etc.) can be partitioned may be identified. At 406, a first chunk of the data may be retrieved from a first client (e.g., the first client may indicate that a crash occurred, and thus may upload a first portion of crash dump information related to the crash). At 408, a second chunk of the data may be retrieved from a second client (e.g., the second client may indicate that a crash, similar to the crash of the first client, occurred, and thus may upload a second portion of the crash dump information related to the crash). At 410, the first chunk, the second chunk, and/or other chunks obtained from one or more other clients may be evaluated to evaluate that data (e.g., chunks of the crash dump information may be combined and evaluated to identify a cause of the crash of the first client and the second client). At 412, the method ends.

Figure 5:
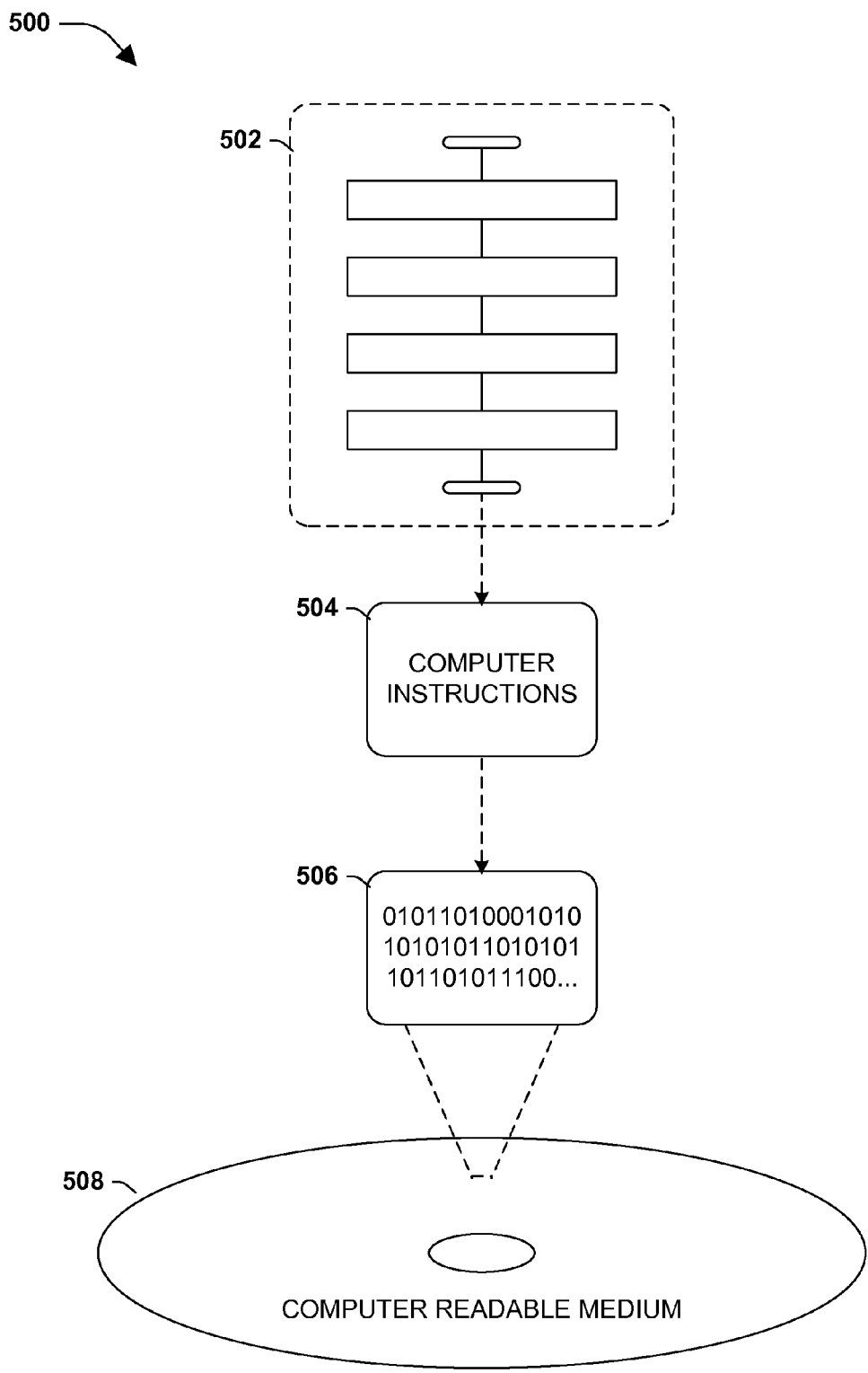
FIG. 5 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 100 of FIG. 1, at least some of the exemplary method 300 of FIG. 3, and/or at least some of the exemplary method 400 of FIG. 4, for example. In some embodiments, the processor-executable instructions 504 are configured to implement a system, such as at least some of the exemplary system 201 of FIG. 2A-2H, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
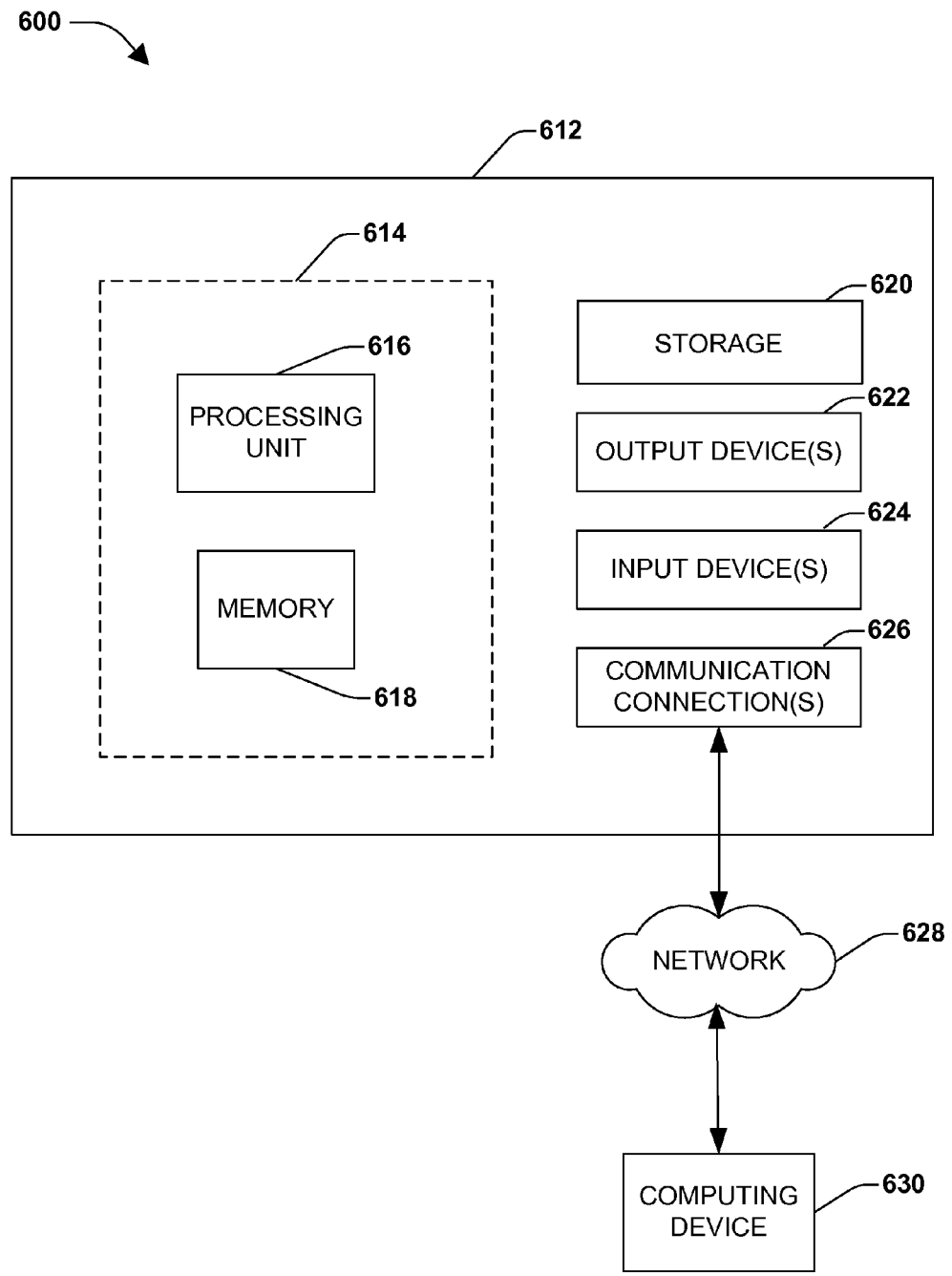
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 600 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Computer storage media does not, however, include propagated signals. Rather, computer storage media excludes propagated signals. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via a network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a"

and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, implemented at a computer system that includes one or more processors, for file acquisition and reputation evaluation, comprising:
    receiving a first reputation request from a first computer client, the first reputation request comprising a unique file identifier of a particular file;
    based at least on receiving the first reputation request:
        determining that there is no existing reputation that corresponds to the unique file identifier of the particular file; and
        based at least on determining that there is no existing reputation that corresponds to the unique file identifier of the particular file:
            identifying a set of chucks into which the particular file can be partitioned, each chunk comprising a portion of the particular file;
            requesting a first chunk of the set of chunks from the first computer client and
            receiving the first chunk of the set of chunks from the first computer client;
    subsequent to receiving the first reputation request, receiving a second reputation request from a second computer client, the second reputation request comprising the unique file identifier of the particular file;
    based at least on receiving the second reputation request, and based at least on having identified the set of chucks into which the file can be partitioned:
        requesting a second chunk of the set of chunks from the second computer client and
        receiving the second chunk of the set of chunks from the second computer client; and
    based at least on receiving the first chunk of the set of chunks from the first computer client, and based at least on receiving the second chunk of the set of chunks from the second computer client, calculating a particular reputation for the particular file.

2. The method of claim 1, further comprising:
    generating a distribution curve based upon the set of chunks, the distribution curve specifying a distribution of chunks within the set of chunks that are to be retrieved from clients.

3. The method of claim 2, the distribution comprising at least one of a random distribution, a sequential distribution, an ordered distribution, an overlapping distribution, a prioritization distribution, or an ordered overlapping distribution.

4. The method of claim 1, further comprising:
    retrieving the first chunk from a third computer client based upon an overlapping distribution specifying redundant retrieval for the first chunk.

5. The method of claim 1, the first chunk comprising overlapping file data with respect to the second chunk.

6. The method of claim 1, the identifying a set of chucks comprising:
    assigning retrieval priorities to respective chunks within the set of chunks.

7. The method of claim 6, the assigning retrieval priorities comprising:
    assigning a first retrieval priority to the first chunk that is higher than a second retrieval priority assigned to the second chunk based upon a determination that the first chunk has a first reputation evaluation relevancy greater than a second reputation evaluation relevancy of the second chunk.

8. The method of claim 1, further comprising:
    receiving a transmission initiation of a third chunk of the file from a third computer client;
    responsive to the third chunk having been previously retrieved, cancelling transmission of the third chunk; or
    responsive to determining that the third chunk has not yet been retrieved, accepting the transmission of the third chunk.

9. The method of claim 1, further comprising:
    querying a file reputation data structure using the unique file identifier to determine whether the reputation exists.

10. The method of claim 1, further comprising:
    assigning the particular reputation to the unique file identifier, and providing the reputation to at least one of the first computer client and the second computer client.

11. The method of claim 1, further comprising:
    comparing the first chunk, from the first computer client, to a second instance of the first chunk, from a computer client other than the first computer client, to verify that the first chunk, from the first computer client, is received in a non-tampered state.

12. The method of claim 1, further comprising:
    scheduling a future acquisition of a third chunk of the particular file from at least one of the first computer client, the second computer client, or a third computer client.

13. The method of claim 1, requesting the first chunk comprising:
    identifying an operating context of the first computer client; and
    scheduling acquisition of the first chunk from the first computer client based upon the operating context corresponding to an upload policy.

14. The method of claim 1, further comprising:
    assigning indicators to respective chunks within the set of chunks; and
    responsive to retrieving the first chunk, setting a first indicator for the first chunk to an acquired state.

15. A computer system, comprising:
one or more processors; and
one or more computer-readable media having stored thereon computer-executable instructions that are executable by the one or more processors to cause the computer system to acquire a file and evaluate reputation of the file, the computer-executable instructions including instructions that are executable to cause the computer system to perform at least the following:
  receive a first reputation request from a first computer client, the first reputation request comprising a unique file identifier of a particular file;
  based at least on receiving the first reputation request:
    determine that there is no existing reputation that corresponds to the unique file identifier of the particular file; and
    based at least on determining that there is no existing reputation that corresponds to the unique file identifier of the particular file:
      identify a set of chucks into which the particular file can be partitioned, each chunk comprising a portion of the particular file;
      request a first chunk of the set of chunks from the first computer client; and
      receive the first chunk of the set of chunks from the first computer client;
  subsequent to receiving the first reputation request, receive a second reputation request from a second computer client, the second reputation request comprising the unique file identifier of the particular file;
  based at least on receiving the second reputation request, and based at least on having identified the set of chucks into which the file can be partitioned:
    request a second chunk of the set of chunks from the second computer client; and
    receive the second chunk of the set of chunks from the second computer client; and
  based at least on receiving the first chunk of the set of chunks from the first computer client, and based at least on receiving the second chunk of the set of chunks from the second computer client, calculate a particular reputation for the particular file.

16. The computer system of claim 15, the computer-executable instructions also including instructions that are executable to cause the computer system to assign a first retrieval priority to the first chunk that is higher than a second retrieval priority assigned to the second chunk based upon a determination that the first chunk has a first reputation evaluation relevancy greater than a second reputation evaluation relevancy of the second chunk.

17. The computer system of claim 15, the computer-executable instructions also including instructions that are executable to cause the computer system to schedule a future acquisition of a third chunk of the particular file from at least one of the first computer client, the second computer client, or a third computer client.

18. The computer system of claim 15, the computer-executable instructions also including instructions that are executable to cause the computer system to compare the first chunk, from the first computer client, to a second instance of the first chunk, from a computer client other than the first computer client, to verify that the first chunk, from the first computer client, is received in a non-tampered state.

19. The computer system of claim 15, the computer-executable instructions also including instructions that are executable to cause the computer system to:
  identify an operating context of the first computer client; and
  schedule acquisition of the first chunk from the first computer client based upon the operating context corresponding to an upload policy.

20. A computer program product comprising one or more hardware storage devices having stored thereon computer-executable instructions that are executable by one or more processors of a computer system to cause the computer system to acquire a file and evaluate reputation of the file, the computer-executable instructions including instructions that are executable to cause the computer system to perform at least the following:
  receive a first reputation request from a first computer client, the first reputation request comprising a unique file identifier of a particular file;
  based at least on receiving the first reputation request:
    determine that there is no existing reputation that corresponds to the unique file identifier of the particular file; and
    based at least on determining that there is no existing reputation that corresponds to the unique file identifier of the particular file:
      identify a set of chucks into which the particular file can be partitioned, each chunk comprising a portion of the particular file;
      request a first chunk of the set of chunks from the first computer client; and
      receive the first chunk of the set of chunks from the first computer client;
  subsequent to receiving the first reputation request, receive a second reputation request from a second computer client, the second reputation request comprising the unique file identifier of the particular file;
  based at least on receiving the second reputation request, and based at least on having identified the set of chucks into which the file can be partitioned:
    request a second chunk of the set of chunks from the second computer client; and
    receive the second chunk of the set of chunks from the second computer client; and
  based at least on receiving the first chunk of the set of chunks from the first computer client, and based at least on receiving the second chunk of the set of chunks from the second computer client, calculate a particular reputation for the particular file.

* * * * *